Nov. 4, 1952 — B. J. CHAPMAN — 2,616,746
BUMPER JACK ATTACHMENT DEVICE
Filed April 8, 1950
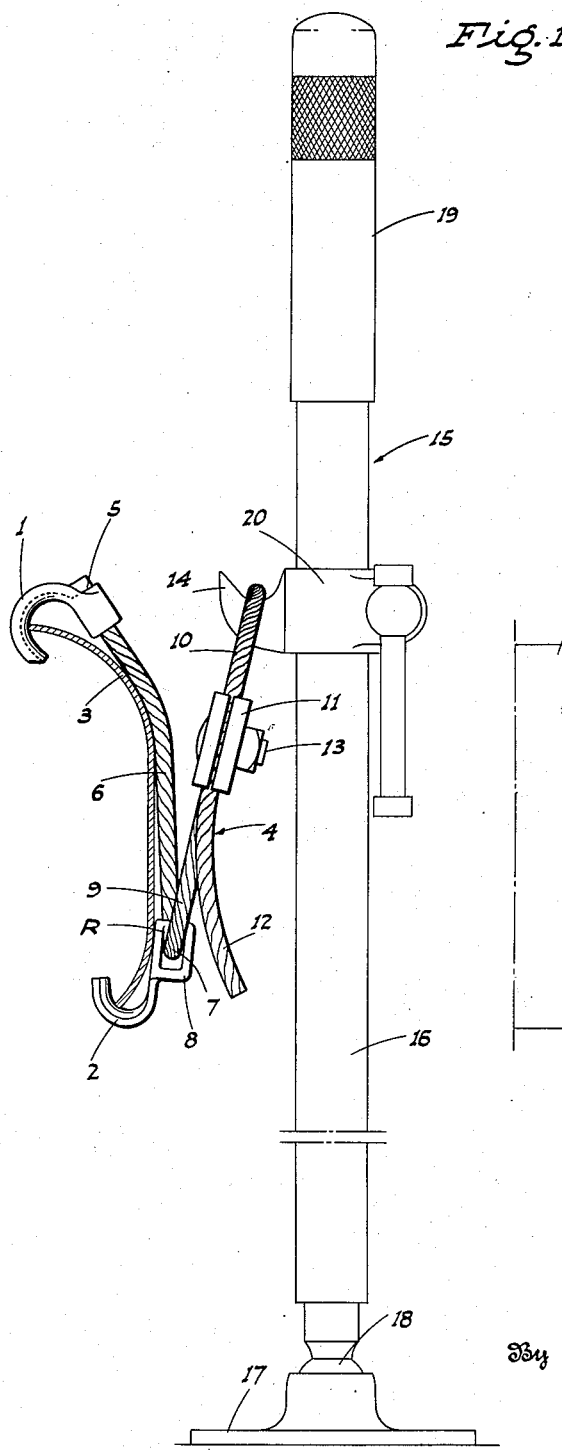
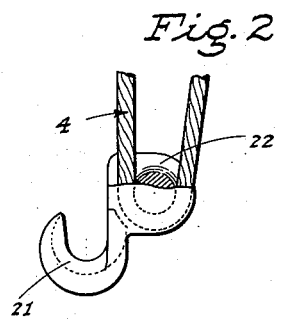
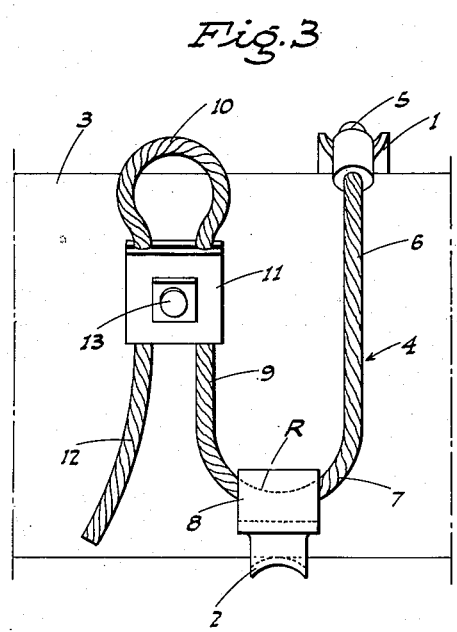
Inventor
Bert J. Chapman

Patented Nov. 4, 1952

2,616,746

UNITED STATES PATENT OFFICE

2,616,746

BUMPER JACK ATTACHMENT DEVICE

Bert J. Chapman, Marysville, Calif.

Application April 8, 1950, Serial No. 154,856

3 Claims. (Cl. 294—78)

A major object of the present invention is to provide a novel device for attaching an automobile jack to a bumper; the device connecting between the jack and bumper and thus being adapted to overcome the difficulties encountered in direct-engaging the jack hook with the lower edge of a bumper.

Another important object of the invention is to provide a bumper jack attachment device which, when in use, has positive connection with the bumper, yet permits the jack to stand perpendicular without upsetting even though the bumper is transversely canted relative to horizontal or the automobile moves slightly; this result being attained by the employment of a flexible connecting member between the bumper and the jack.

A further object of this invention is to provide a bumper jack attachment device which is arranged for hooking engagement with both the upper and lower edges of a bumper, and the device adjusts easily to the height of the bumper.

An additional object of the invention is to provide a bumper jack attachment device which is simple in structure, but strong and rugged; the device being convenient to carry in an automobile along with the jack, and capable of connection to a bumper manually and without the need of tools.

It is also an object of the invention to provide a bumper jack attachment device which is designed for ease and economy of manufacture.

Still another object of the invention is to provide a practical and reliable device, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the device as in use between an automobile bumper, and a bumper jack.

Fig. 2 is a side elevation, partly in section, of a modified form of lower hook.

Fig. 3 is a front elevation of the device as engaged with a bumper, but before attachment to the bumper jack.

Referring now more particularly to the characters of reference on the drawings, and particularly at present to Figs. 1 and 3, the novel, bumper jack attachment device comprises an upper downwardly facing hook 1, and a lower upwardly facing hook 2 adapted to hookingly engage over the upper and lower edges, respectively, of an automobile bumper 3.

The numeral 4 indicates a single length of strong but flexible small-diameter cable, and such cable is anchored at one end, as at 5, to the upper hook 1.

From the upper hook 1 the cable 4 has a descending portion 6 which is looped at its lower end, as at 7, and which loop projects in slidable relation through a transversely elongated cable guide eye 8 formed integral with the lower hook 2.

After passage through the cable guide eye 8, the cable includes an ascending portion 9, the upper end of which is formed as a loop 10 which faces outwardly with respect to the bumper 3.

The loop 10 is maintained fixed by a clamp 11 which engages between the ascending portion 9 and the free end portion 12 of said cable at a point immediately below the loop 10; such clamp including a clamping bolt 13.

The transversely elongated, cable guide eye 8 is formed with the cable engaging part of said eye rounded downwardly from end to end thereof, as at R, so as to permit of easy sliding of the cable through such eye, and also to prevent sharp bending of the cable in the eye, especially when the device is under load.

It is understood that the device may be used with any automobile jack which includes a laterally projecting, preferably upwardly facing hook 14. The jack which is here shown in Fig. 1 for the purpose of illustration is indicated generally at 15, and is of hydraulic type, including a vertically extensible post unit 16, a base 17 to which the post unit 16 is swivelly connected at its lower end, as at 18, and a vertically reciprocable pump handle 19 employed to cause vertical extension of the post unit 16. The post unit 16 carries a clamped-on collar 20 in vertically adjustable relation, and such collar is formed with the laterally projecting hook 14.

When the described bumper jack attachment device is in use, the hooks 1 and 2 are engaged with the corresponding edges of the bumper 3, and the cable 4 is manually pulled relatively tight between said hooks. The fixed loop 10 is then engaged on the hook 14 with the bumper jack standing perpendicular close to, but outwardly of, the bumper 3; the collar 20 having been adjusted to proper position on the post unit 16. Thereafter, the jack is actuated to cause the corresponding portion of the post unit 16 and the collar 20, together with the hook 14, to elevate.

As the hook 14 elevates, the cable 4—connected as described to the bumper—effectively lifts the latter, together with the adjacent portion of the automobile.

The load imposed upon the device is relatively great, and this assures that the hooks 1 and 2 maintain in positive holding engagement with the bumper.

While the device is simple in its structure, and thus readily and economically manufactured, it is extremely convenient and safe to use. Additionally, when in use the device assures that the bumper jack 15 may stand perpendicular without upsetting; any slight motion of the car or lateral canting of the bumper 3 being compensated for by the flexible connection, afforded by the cable, between the lower hook 2 and the bumper jack hook 14.

The device can be attached or detached readily by hand and without the use of any tools, and when not in use such device is small, compact, and can be readily carried in a motor vehicle along with the bumper jack.

In Fig. 2 the modified form of lower hook is indicated generally at 21 and is formed with an integral cable guide eye 22 arranged so that the cable 4 turns through the same in the plane of the hook rather than transversely as in the lower hook shown in Figs. 1 and 3; the advantage being that lesser twist and strain is imposed on the cable.

Should the configuration of a bumper prevent the attachment of the device as described and shown, the device nevertheless may be attached for use by reaching under the bumper and engaging hook 1 over one of the conventional bumper supporting bars; the hook 2 remaining free, and the cable extending downward about the lower edge of the bumper and thence projecting upward for connection of loop 10 on hook 14 of the jack.

Also, the device may be used effectively to attach a tow rope to a bumper, and in this event, the upper hook 1 and lower hook 2 are engaged over the lower and upper edges respectively of the bumper; i. e. in reverse to the positions shown in Fig. 1. Then the tow rope is secured to loop 10 and cable 4 drawn taut.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A bumper-engaging attachment for a ground supported lifting jack having a laterally projecting hook; said attachment comprising an upper downwardly facing hook for engagement over the upper edge of the bumper, a lower upwardly facing hook for engagement with the under edge of the bumper, an outwardly projecting cable guide eye on the upper end of said lower hook and in a plane parallel thereto, a flexible cable anchored to the upper hook and depending thence to and through the eye and ascending thence without restraint as a free run swingable in any direction relative to the eye, and a fixed loop on the upper end of said free run for a jack-hook engagement.

2. An attachment as in claim 1, with means to alter the position of the loop relative to the ends of the cable.

3. An attachment as in claim 1, in which said guide eye is elongated transversely of the hook; the upper cable-engaging surface of the eye being convexly curved from end to end thereof.

BERT J. CHAPMAN.

REFERENCES CITED

The following references are of record in the file of this patent:

UNITED STATES PATENTS

| Number | Name | Date |
| --- | --- | --- |
| 62,489 | Hopkins | Feb. 26, 1867 |
| 198,654 | Meeker | Dec. 25, 1877 |
| 668,932 | Purucker | Feb. 26, 1901 |
| 1,321,950 | Templeton | Nov. 18, 1919 |
| 2,549,862 | Thorndike | Apr. 24, 1951 |